(12) United States Patent
Chen et al.

(10) Patent No.: US 9,156,943 B2
(45) Date of Patent: Oct. 13, 2015

(54) MODIFIED POLYESTERS AND PROCESSES FOR MANUFACTURING THE SAME

(75) Inventors: Wei-Hung Chen, New Taipei (TW);
Tai-You Chen, New Taipei (TW);
Pao-Chi Chen, New Taipei (TW);
Chin-Wen Chen, New Taipei (TW);
Syang-Peng Rwei, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 0 days.

(21) Appl. No.: 13/094,073

(22) Filed: Apr. 26, 2011

(65) Prior Publication Data

US 2012/0277400 A1    Nov. 1, 2012

(51) Int. Cl.
| C08G 69/44 | (2006.01) |
| C08G 63/91 | (2006.01) |
| C08G 63/685 | (2006.01) |
| C08G 63/20 | (2006.01) |

(52) U.S. Cl.
CPC .............. *C08G 63/914* (2013.01); *C08G 63/20* (2013.01); *C08G 63/6854* (2013.01); *C08G 69/44* (2013.01); *C08G 2280/00* (2013.01)

(58) Field of Classification Search
CPC .. C08G 63/6854; C08G 63/914; C08G 63/20; C08G 2280/00; C08G 63/44
USPC ......... 528/272, 288, 296, 302, 332, 335, 339, 528/342
See application file for complete search history.

(56) References Cited

U.S. PATENT DOCUMENTS

| 5,436,056 | A | 7/1995 | Takiyama et al. | |
| 6,268,465 | B1* | 7/2001 | Chomiakow et al. | 528/310 |
| 2003/0055206 | A1* | 3/2003 | Haile et al. | 528/272 |
| 2004/0033336 | A1 | 2/2004 | Schulte | |
| 2005/0065314 | A1 | 3/2005 | Lai | |
| 2007/0244550 | A1 | 10/2007 | Eidenschinki | |

FOREIGN PATENT DOCUMENTS

| CN | 1207747 A | 2/1999 |
| CN | 13377380 A | 10/2002 |
| CN | 101132909 A | 2/2008 |
| CN | 101319088 A | 12/2008 |
| JP | 58-034826 A | 3/1983 |
| JP | 08-325366 A | 12/1996 |

OTHER PUBLICATIONS

Chen et al. "Study on Biodegradable aromatic/Aliphatic Copolyesters", Braz.Journal of Chem.Eng. 2008, V.2, N#2, pp. 321-335.*
English translation of abstract of CN 101319088 A (published Dec. 10, 2008).
English translation of abstract of JP 08-325366 A (published Dec. 10, 1996).
English translation of abstract of JP 58-034826 A (published Mar. 1, 1983).
English translation of abstract of CN 13377380 A (published Oct. 30, 2002).
English translation of abstract of CN 1207747 A (published Feb. 10, 1999).
English translation of abstract of CN 101132909 A (published Feb. 27, 2008).

* cited by examiner

*Primary Examiner* — Ling Choi
*Assistant Examiner* — Gennadiy Mesh
(74) *Attorney, Agent, or Firm* — McClure, Qualey & Rodack, LLP

(57) ABSTRACT

A process for manufacturing a modified polyester, comprising the steps of: obtain a esterification product of diacid, diol, and a branching agent having at least three carboxyl groups, wherein the branching agent is present in an amount of up to 1 mol %, and carrying out a polycondensation reaction of the esterification product and a diamine to obtain the modified polyester, wherein the diamine is present in an amount of about 0.07 to about 0.22 mol %, the diacid comprises a combination of at least one aliphatic diacid and at least one aromatic diacid which is present in an amount no greater than about 10 mol % based upon the total moles of the diacid and the diol. The modified polyester is a thermally induced shape-memory material having an activation temperature of about 40 to 99° C., a percent elongation at break of about 29.9 % to 40.9% and bending modulus of about 40.3 MPa to about 20.1 Mpa.

9 Claims, 3 Drawing Sheets

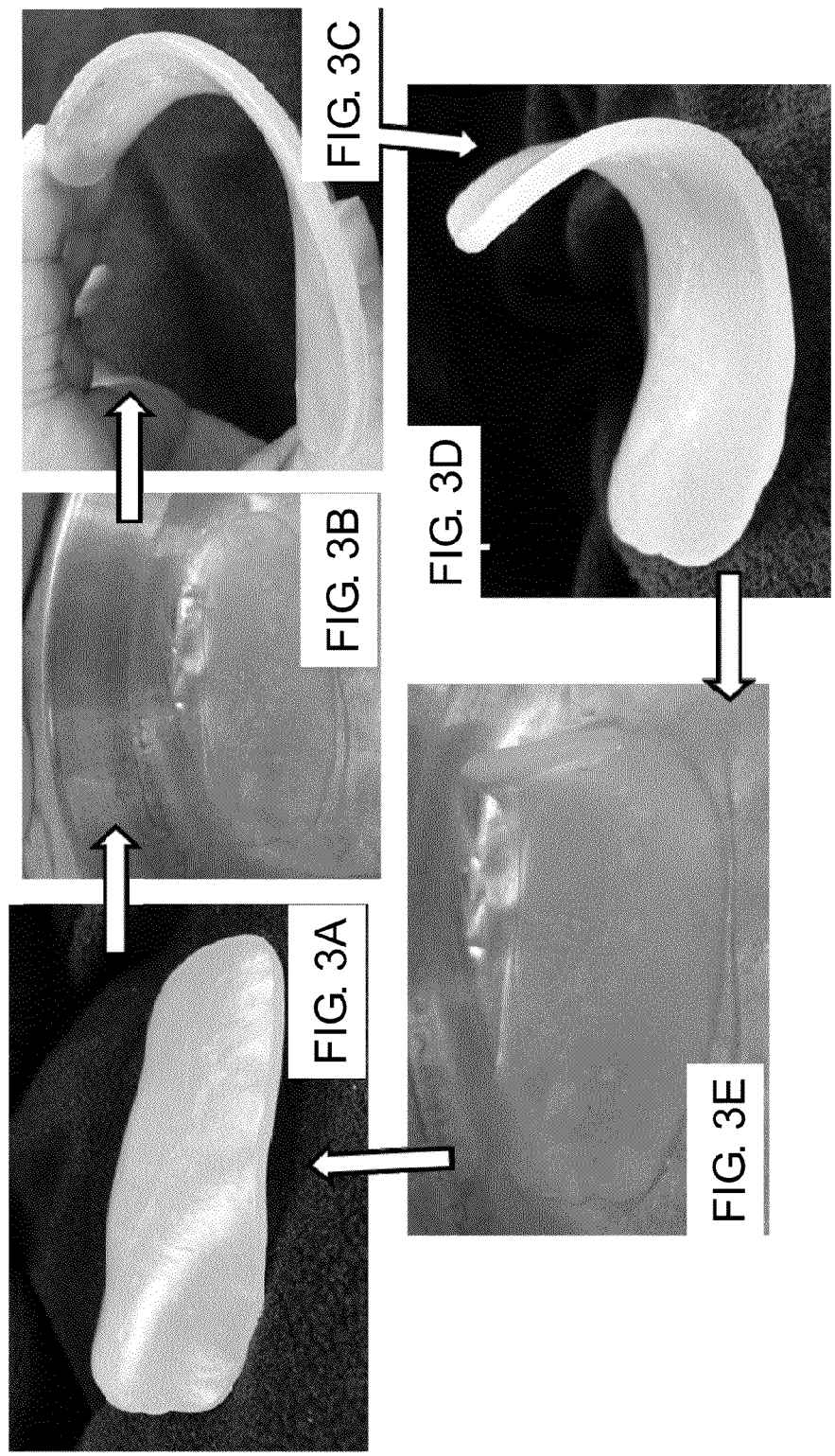

MODIFIED POLYESTERS AND PROCESSES FOR MANUFACTURING THE SAME

BACKGROUND

1. Field of Invention

The present invention relates to aliphatic polyesters and processes for manufacturing the same. More particularly, the present invention relates to modified polyesters and processes for manufacturing the same.

2. Description of Related Art

Aliphatic polyesters are known to be biodegradable and they have significant potential in various fields, such as molded plastic, nonwoven webs, and tissue engineering. However, most known condensation-polymerized aliphatic polyesters do not have desirable thermal and mechanical properties for practical applications since there are no benzene rings present in their backbones. Furthermore, it is very difficult to increase the molecular weight of the aliphatic polyester over 15,000 due to its poor heat stability. As such, the use of these aliphatic polyesters is limited.

Various prior efforts have been made to address this problem.

For example, introduction of amide bonds into the polyester chains can enhance the hydrogen bonding between the aliphatic polymer chains, thereby producing polyester amides with improved flexibility. To this end, the amount of amides present in the conventional polyester amides is generally about 40-70 mol %. However, it is well known that the hydrolysis of amide bonds of the polyamides is quite slow (as compared with the ester bonds of the aliphatic polyesters), and thus, the biodegradability of such polyester amides would be compromised.

Another possible way of improving the mechanical properties of the aliphatic polyesters involves in the addition of branching agents having three functional groups.

For example, U.S. Pat. No. 5,436,056 disclosed the production of high-molecular weight aliphatic polyesters with a tri-functional or tetra-functional ingredient. The branching agents are capable of cross-linking the molecular chains of the aliphatic polyesters thereby increasing the molecular weight, and hence, the mechanical strength, of the resultant polyesters. In this case, the cross-linking level of the reaction should be carefully controlled in order to obtain aliphatic polymers with desirable mechanical properties. This is because that a polymer without sufficient cross-linking level may be too brittle, whereas a polymer with excessive cross-linking level may become thermosetting, and in both cases, it is difficult to mold the polymer. In order to provide suitable level of cross-linking, the polymerization is usually carried out in a moderate way where the reaction temperature is relatively low. However, the manufacture of such polymer under such condition is extremely time-consuming and cost-intensive, thereby hindering the possibility of its mass production.

In view of the foregoing, there exists a need in the art for providing an inexpensive and easy-to-manufacture modified polyester with appropriate mechanical properties, as well as a corresponding process for manufacturing it in a time- and cost-effective way.

SUMMARY

The following presents a simplified summary of the disclosure in order to provide a basic understanding to the reader. This summary is not an extensive overview of the disclosure and it does not identify key/critical elements of the present invention or delineate the scope of the present invention. Its sole purpose is to present some concepts disclosed herein in a simplified form as a prelude to the more detailed description that is presented later.

In one aspect, the present invention is directed to a process for manufacturing modified polyester. According to the principles and spirits of the present invention, the process is carried out in two stages, i.e., esterification followed by polycondensation with the presence of a diamine. Besides, according to the present invention, the manufacturing process could be accomplished in no more than 20 hours, preferably less than 12 hours, thereby greatly enhancing its potentials in mass production and commercialization. Also, by using lesser amount of amine content (less than 6 mol %), the manufacturing method for modified polyester could be simplified, as compared with conventional methods.

According to one embodiment of the present invention, the manufacturing process comprises the steps as follows. First, a mixture of diacid, diol and a branching agent having at least three carboxyl groups is prepared, and an esterification reaction is allowed to proceed at a temperature of about 180 to 300° C. and a pressure of about 1 to 4 bar. Thereafter, a polycondensation reaction of the product of esterification and a diamine is carried out at a pressure below about 0.01 bars to obtain the modified polyester. Generally, the molar ratio of the diacid to the diol is about 1:1 to 1:2, whereas the branching agent and the diamine are respectively added in an amount of about 0.01 to 4 mol % and about 0.01 to 6 mol %, all based upon the total moles of the diacid and the diol.

In another aspect, the present invention is directed to modified polyester. In contrast to conventional polyesters or conventional amine- and amide-modified polyesters, the amine content of the present modified polyester is less than 6 mol % based upon the total moles of the diacid and the diol; yet the modified ester provides satisfactory viscoelasticity, as well as other desirable operational properties, such as optical, thermal, and thermoplastic properties.

According to one embodiment of the present invention, the modified polyester comprises diacid moieties derived from a diacid, diol moieties derived from diol, branching agent moieties derived from a branching agent having at least three carboxyl groups, and diamine moieties derived from a diamine. Generally, the respective amount of the branching agent and the diamine is about 0.01 to 4 mol % and about 0.01 to 6 mol %, all based upon the total moles of the diacid and the diol.

Many of the attendant features will be more readily appreciated as the same becomes better understood by reference to the following detailed description considered in connection with the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present description will be better understood from the following detailed description read in light of the accompanying drawings, wherein:

FIG. 3A to FIG. 3E illustrate the programming and recovery processes of the modified polyester of working example E6.

DETAILED DESCRIPTION

Figure 1:
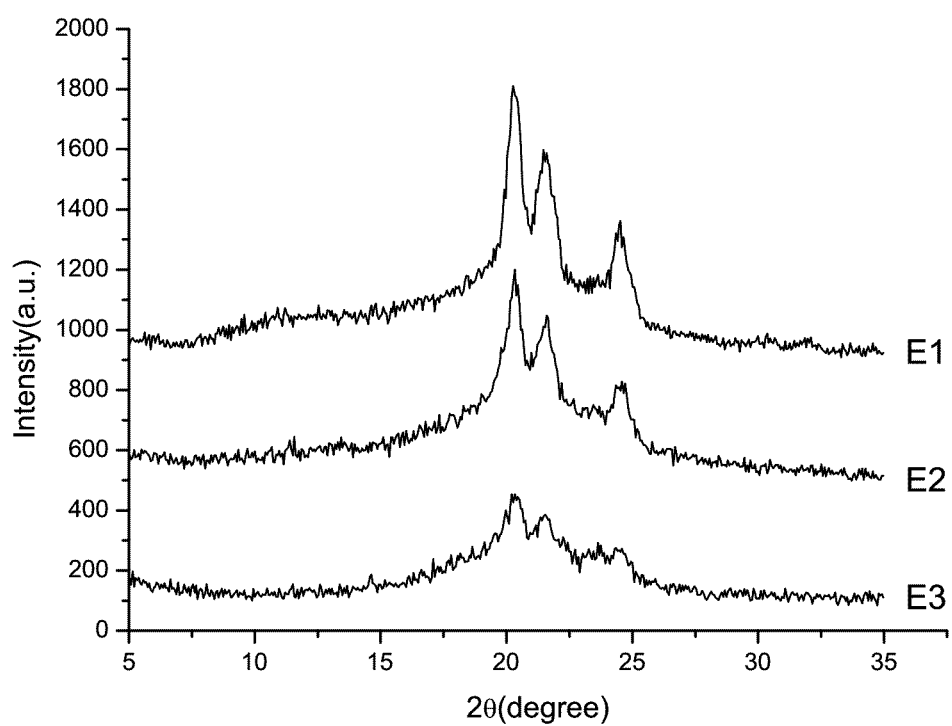
FIG. 1 is an X-ray diffraction diagram of modified polyesters of working examples E1 to E3.

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Conventionally, the cross-linking level of a polyester system should be carefully controlled in the case where branching agents are employed to endow the polyester system with desirable mechanical properties, as noted hereinabove. In view of this, one aspect of the present invention is directed to a process for manufacturing modified polyester in a time-effective way. Generally, the reaction time of the manufacturing process is about 20 hours; preferably, less than 12 hours.

According to one embodiment of the present invention, the manufacturing process is carried out in two stages: esterification and polycondensation, as described hereinbelow in more detail.

In the esterification stage, a mixture of diacid, diol and a branching agent having at least three carboxyl groups is prepared, and an esterification reaction is allowed to proceed at a temperature of about 180 to 300° C. and a pressure of about 1 to 4 bar. In the mixture, the molar ratio of the diacid to the diol is about 1:1 to 1:2, and the branching agent is added in an amount of about 0.01 to 4 mol % based upon the total moles of the diacid and the diol.

In polyesters, the molar ratio of mutually reactive functional groups (in the present case, the carboxylic groups of diacid and the branching agent and hydroxyl groups of diol) is preferably about 1:1, although some variation (generally no more than about 5%) is permissible. However, as could be appreciated by persons having ordinary skill in the art, one way to achieve polyesters with well-defined compositions and predictable molecular weights requires a 1:1 stoichiometry for mutually reactive functional groups in the resultant polymer. As such, in many commercial processes, the manufacturing process is designed to ensure perfect functional group stoichiometry. For example, commercial processes for manufacturing polyesters often utilize diacid in the presence of excess diol to form the stoichiometric precursor in situ.

In the present case, it should be noted that the branching agent is added in an amount of about 0.01 to 4 mol % based upon the total moles of the diacid and the diol which is much lesser as compared to the total amounts of the diacid and the diol. As such, the presence of the carboxyl groups of the branching agents would not impose significant effects on the stoichiometry of the reacting functional groups in the resultant polyester. Accordingly, the amount of the branching agent is neglected in considering the molar ratio of the reacting monomers (that is, diacid and diol) in the reaction mixture.

In view of the foregoing, the molar ratio of the diacid to the diol in the reaction mixture is preferably about 1:1 to 1:2; more preferably, about 1:1.2 to 1:2; still more preferably, about 1:1.5 to 1:1.8, according to embodiments of the present invention.

As used herein, the term "diacid" is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. For example, the term "terephthalic acid" as used herein is intended to include terephthalic acid itself and residues thereof as well as any derivative of terephthalic acid, residues thereof, or mixtures thereof.

Generally, the diacid suitable for use in the present reaction mixture could be at least one aliphatic diacid or a combination of at least one aliphatic diacid and at least one aromatic diacid. For example, the diacid used in the reaction mixture may contain two aliphatic diacids; two aliphatic diacids and one aromatic diacid; or one aliphatic diacid and two aromatic diacid.

In the case where the diacid for use in the present reaction mixture is a combination of at least one aliphatic diacid and at least one aromatic diacid, it is preferably the aromatic diacid is present in an amount no greater than about 10 mol % based upon the total moles of the diacid and the diol, so that the resultant modified polyester exhibits desirable biodegradability as well as satisfactory mechanical properties.

The term "aliphatic", as used herein with respect to the diacid, diol or diamine, means that carboxyl, hydroxyl and amino groups of these molecules are not connected through an aromatic nucleus. For example, adipic acid contains no aromatic nucleus in its backbone, i.e., the chain of carbon atoms connecting the carboxylic acid groups; thus, it is "aliphatic". By contrast, the term "aromatic" means the compound contains an aromatic nucleus in the backbone; for example, terephthalic acid. It should be noted that, in the context of the description and the claims of the present invention, aliphatic is intended to include linear and branched chain structures. The term "aliphatic", however, is not intended to exclude any aromatic substituent that may be attached to the backbone of an aliphatic or cycloaliphatic diacid, diol or diamine.

In some embodiments of the present invention, an aliphatic diacid is a diacid having 4 to 12 carbon atoms, and preferably, 6 to 10 carbon atoms, in its backbone. Illustrative examples of the aliphatic diacid include: succinic acid, glutaric acid, adipic acid, pimelic acid, suberic acid, azelaic acid, sebacic acid, undecanedioic acid, and dodecanedioic acid. Illustrative examples of the aromatic diacid include: terephthalic acid, isophthalic acid, and 2,6-naphthalene dicarboxylic acid.

Diols suitable for use in the present reaction mixture are aliphatic diols having 2 to 8 carbon atoms in its backbone. Specifically, some illustrative examples of such aliphatic diol include: 1,2-ethanediol, 1,2-propanediol, 1,3-propanediol, 1,4-butanediol, 1,5-pentanediol, 1,6-hexanediol, 1,7-heptanediol, and 1,8-octanediol. In some embodiments, the mixture may contain two or more aliphatic diols.

As described hereinabove, in the process for manufacturing the polyester according to the present embodiment, one or more tri-carboxyl branching agent is added in quantities coming between 0.01 to 4 mol % based upon the total moles of the diacid and the diol, in order to obtain branched products. Preferably, the amount is about 0.05 to 2 mol %, and more preferably, the amount is about 0.1 to about 1 mol %, all based upon the total moles of the diacid and the diol. Specifically, the amount of the branching agent could be about 0.01, 0.02, 0.03, 0.04, 0.05, 0.06, 0.07, 0.08, 0.09, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.5, 2, 2.5, 3, 3.5, or 4 mol % based upon the total moles of the diacid and the diol.

Examples of these branching agents include, but are not limited to: trimellitic acid, trimesic acid, trimethylolpropane triacrylate, ethoxylated trimethylolpropane triacrylate, propoxylated trimethylolpropane triacrylate, glyceryl triacrylate, ethoxylated glyceryl triacrylate, propoxylated glyceryl triacrylate, glyceryl trimethacrylate, ethoxylated glyceryl trimethacrylate, propoxylated glyceryl trimethacrylate, trimethylolpropane trimethacrylate, ethoxylated trimethylolpropane trimethacrylate, and propoxylated trimethylolpropane trimethacrylate.

In this esterification stage, the above-described reaction mixture is allowed to react at suitable reaction conditions as described hereinbelow. In various embodiments of the present invention, the reaction temperature for esterification is set at about 180 to 300° C., and preferably, about 220 to 280° C. Also, the reaction pressure for esterification suitably ranges from about 1 to 4 bar, and preferably, about 1.5-3 bar.

The retention time for the esterification reaction will depend upon the amounts of acids (that is, the diacid and the branching agent) present, the conversion level sought, the reactivity and amount of diol as well as the temperature of the process, the type of reactor and the extent of mixing. Retention times thus can range from about 1 to 6 hours, preferably in the range of about 1 to 4 hours, and more preferably, about 1 to 2 hours. Specifically, the retention time for the esterification may be about 0.5, 1, 1.5, 2, 2.5, 3, 3.5, 4, 4.5, 5, 5.5, or 6 hours.

Often, the reactivity of the above-described diol and retention time is sufficient to convert at least about 50 mole percent, preferably at least about 75 mole percent, and more preferably at least about 95 mole percent of the acids to esters.

After the esterification stage, a polycondensation reaction of the product of esterification and a diamine is carried out at a pressure below about 0.01 bars to obtain the modified polyester.

In practice, in the polycondensation stage, at least one diamine is added in a quantity of about 0.01 to 6 mol % based upon the total moles of the diacid and the diol. For example, the amount of the diamine is about 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, or 6 mol %, and preferably about 0.02 to 1.5 mol %; more preferably about 0.1 to 1 mol %, all based upon the total moles of the diacid and the diol.

The diamine for use in embodiments of the present invention includes any suitable aliphatic diamines. Illustrative examples of aliphatic diamines include but are not limited to: hexamethylenediamine, heptamethylenediamine, octylenediamine, nonamethylenediamine, and decamethylenediamine. In some embodiments, two or more diamines may be used during the polycondensation reaction.

The retention time for the polycondensation reaction generally ranges from 0.5 to 6 hours, preferably in the range of about 1 to 3 hours, and more preferably, about 1 to 1.5 hours. Specifically, the retention time may be about 0.5, 1, 1.5, 2, 2.5, 3, 3.5, 4, 4.5, 5, 5.5, or 6 hours.

In sum, the total time required for the esterification and polycondensation reactions is about 1.5 to 12 hours; preferably, about 2 to 7 hours; and more preferably about 3 to 5 hours. The manufacturing time of the present method is good and reasonable for mass production.

It should be noted that according to the principles and spirits of embodiments of the present invention, the esterification and polycondensation reactions are carried out in two separate stages with the diamine being added after the esterification stage. Without being bound to any theory, it is believed that the diamine plays important roles in the polycondensation reaction and hence the properties of the final product.

First, the diamine serves to control the physical properties of the polyester. As described hereinabove, the polycondensation according to embodiments of the present invention is preferably carried out at a condition of negative atmospheric pressure, more preferably at nearly vacuum conditions. In the present condition, the amino groups of the diamine would compete with the hydroxyl groups of the diol during the polycondensation thereby affecting the physical properties of the final product (i.e., the modified polyester). Specifically, the formation of amides by the reaction of amines and polyesters would increase the amount of hydrogen bonds within the present modified polyester thereby rendering the modified polyester more hydrophilic.

In view of the foregoing, rather than performing a polymerization reaction in a moderate way as the conventional manufacturing process, the control of the physical properties such as the flexibility of the resultant polyester can be easily achieved by the addition of the diamine in a relatively small amount in the polycondensation reaction stage, according to embodiments of the present invention.

It is known that higher contents of aromatic nucleus and amide bond within a polyester system may result in the downgrade of its biodegradability. Also, the polyesters are often too rigid due to the presence of benzene rings. In the present method, it should be noted that the aromatic diacid, if any, should be added in an amount less than 10 mol % based upon the total moles of the diacid and diol. Also, the amount of the diamine is less than 6 mol % based upon the total moles of the diacid and diol, which in turns renders the present modified polyester less toxic to living cells. As such, the present modified polyester is biocompatible and is suitable for use as materials in contact with living tissues.

Moreover, the addition of diamine in an amount substantially less than the amount used in the conventional arts would result in significant change to some properties of the resultant modified polyester, in accordance with the present manufacturing method. For example, as can be evidenced from the working examples provided hereinbelow, the presence of the diamine moieties in such a minor amount (in contrast to that of a conventional polyester amide) unexpected resulted in significant increase in the flexibility of the modified polyester.

Hence, in another aspect, the present invention is directed to a modified polyester prepared in accordance with the manufacturing methods described hereinabove. In contrast to conventional polyester amides, the amine content of the present modified polyester is less than 6 mol % based upon the total moles of the diacid and the diol; yet, the modified polyester provides satisfactory viscoelasticity, as well as other desirable operational properties, such as optical, thermal, and thermoplastic properties.

According to one embodiment of the present invention, the modified polyester comprises diacid moieties derived from a diacid, diol moieties derived from diol, branching agent moieties derived from a branching agent having at least three carboxyl groups, and diamine moieties derived from a diamine. Generally, the molar ratio of the diacid to the diol is about 0.9:1 to 1.1:1, and the respective amount of the branching agent and the diamine is about 0.01 to 4 mol % and about 0.01 to 6 mol %, all based upon the total moles of the diacid and the diol.

As described hereinabove, during the preparation process, the molar ratio of the diacid to the diol is about 1:1 to 1:2 to ensure perfect functional group stoichiometry in the resultant modified polyester. According to embodiments of the present invention, diamine and the branching agent are added in an amount of about 0.02 to 10 mol % based upon the total moles of the diacid and the diol. As such, in the resultant modified polyester, the branching agent moieties and diamine moieties are present in an amount of less than 10 mol %, based on the total moieties of the modified polyester. In this regard, the molar ratio of the diacid to the diol within the modified polyester may deviate +/−10% from the perfect stoichiometry ratio (i.e., 1:1). According to embodiments of the present invention, the molar ratio of the diacid to the diol is about 0.9:1 to 1.1:1; preferably about 0.95:1 to 1.05:1; and more preferably about 0.98:1 to 1.02:1.

The diacid of the modified polyester can be an aliphatic or aromatic diacid. Illustrative examples of aliphatic diacids include, but are not limited to: succinic acid, glutaric acid, adipic acid, pimelic acid, suberic acid, azelaic acid, sebacic acid, undecanedioic acid, and dodecanedioic acid. Illustrative examples of the aromatic diacid include: terephthalic acid, isophthalic acid, and 2,6-naphthalene dicarboxylic acid. In some embodiments, the polyester may contain two or more diacids. In the case where the modified polyester contain diacid moieties derived from both aliphatic and aromatic diacid, the moieties derived from the aromatic diacid is no greater than 10 mol % based upon the total moles of the diacid and the diol.

The diol of the modified polyester is aliphatic diol, illustrative examples of which include, but are not limited to: 1,2-ethanediol, 1,2-propanediol, 1,3-propanediol, 1,4-butanediol, 1,5-pentanediol, 1,6-hexanediol, 1,7-heptanediol, and 1,8-octanediol. In some embodiments, the modified polyester may contain two or more aliphatic diols.

Generally, the amount of the branching agent present in the modified polyester is about 0.01 to 4 mol % based upon the total moles of the diacid and the diol. Specifically, the amount of the branching agent is about 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, or 4 mol % based upon the total moles of the diacid and the diol.

Examples of the tri-functional branching agents of the modified polyester include, but are not limited to: trimellitic acid, trimesic acid, trimethylolpropane triacrylate, ethoxylated trimethylolpropane triacrylate, propoxylated trimethylolpropane triacrylate, glyceryl triacrylate, ethoxylated glyceryl triacrylate, propoxylated glyceryl triacrylate, glyceryl trimethacrylate, ethoxylated glyceryl trimethacrylate, propoxylated glyceryl trimethacrylate, trimethylolpropane trimethacrylate, ethoxylated trimethylolpropane trimethacrylate, and propoxylated trimethylolpropane trimethacrylate. In some embodiments, the modified polyester may contain two or more branching agents.

The diamine is present in the modified polyester in an amount of about 0.01 to 6 mol % based upon the total moles of the diacid and the diol. For example, the amount of the diamine is about 0.01, 0.05, 0.1, 0.15, 0.2, 0.25, 0.3, 0.35, 0.4, 0.45, 0.5, 0.55, 0.6, 0.65, 0.7, 0.75, 0.8, 0.85, 0.9, 0.95, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.1, 5.2, 5.3, 5.4, 5.5, 5.6, 5.7, 5.8, 5.9, or 6 mol % based upon the total moles of the diacid and the diol.

The diamine of the present modified polyester can be any suitable aliphatic diamines. Illustrative examples of aliphatic diamines include but are not limited to: hexamethylenediamine, heptamethylenediamine, octylenediamine, nonamethylenediamine, and decamethylenediamine. In some embodiments, the modified polyester may contain two or more diamines.

The modified polyester according to some embodiments of the present invention has a melting temperature of about 40 to 90° C. For example, the melting temperature may be about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90° C. As could be appreciated by those with ordinary skills in the art, the melting temperature of the final polyester could be adjusted by altering the blend of the reaction mixture.

As could be apparent from the working examples provided hereinbelow, the present modified polyester exhibits various desirable operational properties, including, flexibility, viscoelasticity, and mechanical, optical, thermal, and thermoplastic properties, as well as biocompatibility, and hence, it is suitable to be applied to versatile applications.

For example, the present modified polyester could be used as a shape memory polymer; more particular, a thermally induced shape memory polymer.

Generally, shape-memory materials (such as shape memory alloys and shape memory polymers) have the ability to change their shapes upon the application of external stimuli such as temperature, pH, ionic strength and so on. In the present case, the modified polyesters according to embodiments of the present invention are thermally induced shape memory polymers in which the change in shape is caused by a change in temperature. According to embodiments of the present invention, the shape memory polymer has a phase transformation temperature ($T_{trans}$, also known as activation temperature) below about 99° C., such as in the range of about 40-99° C. For example, the phase transformation temperature may be about 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, or 99° C.

Experiments and analysis as described hereinbelow evidence that the present modified polyester is a melting point ($T_m$) based shape memory material, which means $T_{trans}$ and $T_m$ of the material are substantially equal. As such, the phase transformation temperature of the modified polyester of the present invention may be adjusted using varying blends of the reaction mixture to alter the melting temperature of the resultant polyester. Generally, the higher the carbon numbers of the aliphatic diacid, the higher the melting temperature and thus the higher the phase transformation temperature of the modified polyester.

As could be appreciated by persons with ordinary skills in the art, conventional shape memory materials carry several disadvantages such as a high phase transformation temperature (hundreds of degrees Celsius), relatively minor deformation (on the order of 10%) and high manufacturing cost. By contrast, the present modified polyester is both easy-to-made and easy-to-use. In particular, the phase transformation temperature of the present polyester is much lower than some conventional shape memory materials. Since the shape memory effect can be achieved by changing the operation temperature to below or above the phase transformation temperature, the lower phase transformation temperatures, as in the present case, are advantageous at least in that the user may handle the material in a relatively lower, and hence safer, operation temperature. Also, the activation period of the present modified polyester is quite short. In some embodiments, the modified polyester becomes pliable in about 1 minute upon being heated to its phase transformation temperature.

Besides, the transparency of the modified polyester would change depending on the surrounding temperature. Specifically, the visible light transmittance of the present modified polyester may gradually increase upon heating. More particularly, the present modified polyester may become substantially transparent (i.e., having a visible light transmittance of at least 70%) upon being heated up above the phase transformation temperature. As such, it is more convenient for the user to determine that whether the activation has been completed, that is, whether the present modified polyester has become pliable to be shaped.

Moreover, the present modified polyester exhibits suitable flexibility even in its rigid phase, which greatly enhances its applicability in many fields. For example, the present modified polyester is suitable for medical use, such as volar splint, stirrup splint, sugar tong splint and ulnar gutter splint. Specifically, according to some embodiments of the present invention, the modified polyester has an elongation at yield of at least about 25% at room temperature (about 25 to 27° C.) and an elongation at yield of about at least 90% at about 40° C. In one embodiment, the modified polyester exhibits an elongation at yield of about 500% at about 40° C.

In another example, the present modified polyester may be used as a temperature-sensitive indicator. As described hereinabove, the visible light transmittance of the present modified polyester may increase as the surrounding temperature increases. The temperature upon which the modified polyester becomes transparent depends on and can be adjusted by the composition of the reactants for preparing the modified polyester. As such, the present modified polyester is operable to indicate the approximate temperature of an object that it attaches to.

Moreover, since the modified polyester become pliable upon being heated to its phase transformation temperature, it is possible to deform the activated modified polyester so that it may conform to any non-planar surfaces. In one example, the pliable modified polyester is attached to the outer surface of a container, and if the temperature of the content within the container is higher than a certain temperature, the transparency of the modified polyester may change to such an extent that the user may be aware of this condition. For example, if the temperature of the content within the container is higher than the phase transformation temperature of the modified polyester, the modified polyester attached to the container may become substantially transparent (i.e., having a visible light transmittance of at least 70%), and hence the user may be more cautious while handling them.

In some applications, the biocompatibility of the plastic material is of great concern. As discussed hereinabove, the present modified polyester is non-cytotoxic, and thus the biocompatibility thereof is quite satisfactory. As such, the present modified polyester could be use in these applications.

Some working examples according to embodiments of the present invention are provided hereinafter, wherein the constituents making up reactants and molar percent thereof were adjusted to obtain various modified polyesters. Some mechanical, optical, and thermal properties of the thus-obtained modified polyesters were analyzed.

Specifically, the modified polyesters of the working examples are prepared as follows.

In working example E1, a mixture of about 0.36 mole of adipic acid, about 0.72 mole of ethanediol and about 0.00076 mole of trimesic acid (the branching agent) was prepared, and an esterification reaction was allowed to proceed at a temperature of about 220 to 280° C. and a pressure of about 1 to 4 bar for a retention time of about 1 to 2 hours. Next, about 0.0008 mole of the hexamethylenediamine (HMDA) was added to the product of esterification, and a polycondensation reaction was carried out at a pressure below about 0.01 bars to obtain the modified polyester E1. Modified polyesters of working examples E2 and E3 were prepared by similar processes except for the amount of HMDA used in the manufacturing process. Specifically, in working example E2, about 0.0016 mole of HMDA was added, whereas about 0.0024 mole of HDMA was added in working example E3. It should be noted that the mole amount of HDMA to the total mole of the reactant is about 0.07%, 0.15% and 0.22% respectively in working examples E1, E2 and E3.

Modified polyesters of comparative examples were also prepared. In comparative example C1, a mixture of about 0.36 mole of adipic acid and about 0.72 mole of ethanediol was first prepared without the addition of trimesic acid (the branching agent); thereafter, an esterification reaction was allowed to proceed (reaction temperature: about 220 to 280° C.; reaction pressure: about 1 to 4 bar; retention time: about 1 to 2 hours) followed by a polycondensation reaction at a pressure below about 0.01 bars to obtain the polyester C1. In comparative example C2, the mixture consisted of about 0.36 mole of adipic acid, about 0.72 mole of ethanediol and about 0.00076 mole of trimesic acid, whereas the conditions for the esterification reaction and polycondensation reaction were the same as those described hereinabove regarding the comparative example C1. In comparative example C3, a mixture of about 0.36 mole of adipic acid, about 0.72 mole of ethanediol, about 0.00076 mole of trimesic acid, and about 0.0008 mole of HMDA was first prepared, and then the esterification and polycondensation reactions were carried out sequentially under conditions set forth above to obtain the modified polyester C3.

The thus-obtained polyesters were cut into the form of a cantilever beam, and the cantilever beam was subjected to ASTM D638 (Standard Test Method for Tensile Properties of Plastics) test to determine the tensile strength and percent elongation thereof. In addition, thus-obtained polyesters were cut into the form of a rectangular bar, which was then subjected to ASTM D790 (Standard Test Methods for Flexural Properties of Unreinforced and Reinforced Plastics and Electrical Insulating Materials) test to determine the bending strength and bending modulus thereof. These tests were carried out at room temperature (about 25 to 27° C.) and in accordance with other defined conditions set forth in these standards, and test results are summarized in Table 1.

TABLE 1

|  | Tensile Strength (MPa) | Percent Elongation (%) | Bending Strength (MPa) | Bending Modulus (MPa) |
| --- | --- | --- | --- | --- |
| E1 | 14.1 | 29.9 | 25.7 | 40.3 |
| E2 | 10.3 | 36.1 | 20.8 | 30.5 |
| E3 | 6.1 | 40.9 | 13.1 | 20.1 |
| C1 | na* | na* | 8.7 | 140.6 |
| C2 | 9.3 | 5.99 | 34.7 | 237.8 |
| C3 | 0.04 | 12.7 | 6.58 | 81.2 |

*Polyester of comparative example C1 was too brittle to be formed into a cantilever beam, and hence cannot be subjected to ASTM D638 test.

Data summarized in Table 1 reveal that the modified polyesters according to embodiments of the present invention exhibit satisfactory tensile and flexural properties as compared with polyesters of the comparative examples.

Tensile properties may provide useful data for plastics engineering design purposes. Specifically, the tensile strength of a material is the maximum amount of tensile stress that it can take before failure, for example breaking, and percent elongation is the change in gage length relative to the original specimen gage length, expressed as a percent.

First of all, it should be noted that the polyester of comparative example C1 (hereinbelow, polyester C1) exhibited poor tensile properties and was then ineligible for ASTM D638 test due to its brittleness.

The effect of the addition of HMDA in a minor amount to the tensile properties of the modified polyester could be evidenced by comparing the percent elongations at break (hereinafter, percent elongation) summarized in Table 1. For example, the percent elongations of modified polyester of working example E1 (hereinbelow, modified polyester E1) and modified polyester of comparative example C2 (hereinbelow, modified polyester C2) are 29.9% and 5.99%, respectively. In addition, the percent elongations of modified polyesters E1, E2 and E3 are 29.9%, 36.1% and 40.9%, respectively. These results reveal that the addition of HMDA may significantly improve the percent elongation of the modified polyesters. Moreover, the tensile strengths of the modified polyesters E1 and E2 are higher than that of polyester C1. In working examples E1 to E3, it is found that the tensile strength may slightly decrease as the amount of HMDA increases, which means the materials are more susceptible to be stretched or extended under the external force.

Unlike the embodiments of the present invention where HMDA should be added after the esterification reaction, in comparative example C3, HMDA was added before the esterification reaction. Test results illustrate that both the tensile properties and percent elongation of modified polyester C3 are declined to an unsatisfactory extent. Specifically, the tensile strength and percent elongation of modified polyester C3 are 0.04 MPa and 12.7%, respectively. Judging from these data, it is inferred that the presence of HMDA during the esterification reaction may render the reaction between the diacid and diol incomplete thereby jeopardizing the tensile properties of the resultant modified polyester.

Flexural properties are especially useful for quality control and specification purposes. As used herein, bending strength is defined as the maximum stress a sample material is able to bear under load at the time of rupture or when it reaches the predefined deflection, and bending modulus is a measure of stiffness or rigidity and is calculated by dividing the change in stress by the change in strain at the beginning of the test. Generally, a material having a lower bending strength and a lower bending modulus is more soft and flexible than other materials. By contrast, a material having a lower bending strength and a higher bending modulus is very crispy, whereas a material having a higher bending strength and a higher bending modulus is hard and rigid.

Referring to Table 1, the bending strength of polyester C1 is about 8.7 MPa and the bending modulus thereof is 140 MPa. These data reveal that polyester C1 exhibits a relative low bending strengths and a relative high bending modulus, which means that the polyester C1 is quite brittle and does not possess satisfactory mechanical strength. In fact, the polyester C1 could be easily crumbled by hand.

As compared with polyester C1, both of the bending strength and the bending modulus of modified polyester C2 are higher (about 34.7 MPa and 237.8 MPa, respectively). As such, modified polyester C2 is more rigid and less susceptible to bending. These results evidence that the addition of branching agent during the manufacturing process (such as in comparative example C2) would increase the rigidity of the modified polyester.

Similar to polyester C1, modified polyester C3 also exhibit a relative low bending strength (about 6.58 MPa) and a relative high bending modulus (about 81.2 MPa). Hence, modified polyester C3 is brittle and could be crumbled by hand. These results suggest that the addition of the diamine (HMDA) before the esterification stage may result in a modified polyester tending to be brittle.

In contrast to modified polyesters of comparative examples C1 to C3, the modified polyesters of working examples E1 to E3 exhibit more satisfactory flexural properties.

Still referring to Table 1, the bending modulus of the modified polyester E1 (about 40.3 MPa) is significantly lower than that of polyester C1, which evidences that the addition of minor amount of diamine would substantially modified the flexural property of the conventional aliphatic polyester (i.e., polyester C1).

Also, both the bending strength (about 25.7 MPa) and bending modulus (about 40.3 MPa) of the modified polyesters E1 are lower than those of the modified polyesters C2. As such, modified polyester E1 is softer and more flexible than modified polyester C2.

Modified polyesters E2 and E3 are also more flexible as compared with polyesters C1 to C3 since modified polyesters E2 and E3 exhibit lower bending modulus. In addition, as shown in Table 1, the bending strengths and bending moduli of modified polyesters E1 to E3 decrease as the amount of diamine increases.

Again, these test results confirmed that the addition of minor amount of diamine would substantially affect the flexural property of the resultant polyester. Also, these test results evidence that the diamine added during the polymerization stage of the above-described manufacturing process serves to control the physical properties of the final product.

In view of the foregoing, the modified polyester according to embodiments/examples of the present invention exhibit both satisfactory bending strength and bending modulus as compared to convention, non-cross-linked aliphatic polyester and conventional cross-linked polyester Modified polyesters according to present invention are straight chain polyesters. Such straight chain polyesters have shown great potential in tissue engineering applications. Hence, in vitro test was carried out in accordance with the Guideline for Limulus Amebocyte Lysate (LAL) Testing released by US Food and Drug Administration (FDA) to determine the endotoxicity observed in the modified polyesters E1 to E3. The LAL test is a useful and specific means to detect and measure endotoxin, a fever-producing byproduct of gram-negative bacteria commonly known as pyrogen. The basis of the test is that endotoxin produces an opacity and gelation in LAL that is readily recognized.

The test was conducted by mixing LAL reagent and test specimen in a tube, and promptly incubating the mixture undisturbed for 60 minutes at 37° C. Each tube is interpreted as either positive or negative, wherein a positive result is defined as the formation of a firm gel capable of maintaining its integrity when the test tube is inverted 180°, whereas a negative result is characterized by the absence of gel or by the formation of a viscous mass which does not hold when the tube is inverted. A positive response on the gel clot test indicates there is an amount of endotoxin in the sample which equals or exceeds the reagent's predetermined sensitivity. The endotoxin level (expressed in endotoxin unit per millimeter, EU/mL) of the sample was calculated based on the gel clot test results and in accordance with the predetermined sensitivity of the LAL reagent, and the results are summarized in table 2.

TABLE 2

| | Endotoxin level (EU/mL) |
|---|---|
| E1 | 0.43 |
| E2 | 0.36 |
| E3 | 0.50 |

According to the above-identified guideline, the general endotoxin limit for medical device eluates must not exceed 0.5 EU/mL. As illustrated in Table 2, modified polyesters E1 to E3 each has an endotoxin level of about 0.43 EU/mL, 0.36 EU/mL, and 0.50 EU/mL. As such, the present modified polyesters E1 to E3 are considered to exhibit no significant endotoxicity.

X-ray diffraction (XRD) is a powerful technique for investigating crystallography of materials. Generally, the composition and degree of crystallinity of a material could be determined based upon the peak position and intensity measured by XRD. FIG. 1 is an X-ray diffraction diagram of modified polyesters of working examples E1 to E3. As shown in FIG. 1, the crystallinities of these modified polyesters ranked from the highest to the lowest are E1, E2, and E3. Since the amount of the diamine (HMDA) is the only variable among these three working examples, it is inferred that the amount of the diamine may affect the degree of crystallinity of the resultant polymer. Specifically, these results reveal that the higher the amount of the diamine, the lower the degree of crystallinity of the resultant modified polyester.

As would be appreciated by persons with ordinary skills in the art, the degree of crystallinity of a material is related to the melting temperature ($T_m$) and other physical properties thereof. As such, differential scanning calorimetry (DSC) was carried out to investigate the transition temperature(s) and thermodynamic properties of the present modified polyesters. In this analysis, six modified polyesters (E1 to E6) were characterized by a differential scanning calorimeter (Model: LT-Modulate DSC 2920) in a temperature range of −20° C. to 200° C. at a heat rate of 10° C./min, and the cycle was repeated for 3 times. It should be noted that working examples E4-E6 were prepared in a way similar to that used for preparing working examples 1-3 respectively, except that sebacic acid (with carbon number 10) was used in working examples E4-E6 in lieu of adipic acid (with carbon number 6). By studying phase diagrams produced by the DSC analysis, melting temperatures of these samples were determined, as summarized in Table 3.

In addition, the contact angles of modified polyesters E1 to E6 were determined by the contact angle goniometer (Model: FACE Contact Angle Meter CA-D TYPE). Also, the modified polyesters of working examples E1 to E6 were made into the form of a cantilever beam having a thickness of about 3±0.2 mm. Than a spectrum detector (Model: Spectrum Detective: Energy Transmission Meter SD 2400) was used to determine the visible light transmittance of these samples under various temperatures. The melting temperatures, light transmittances and contact angles of these modified polyesters are summarized in table 3.

TABLE 3

| | Tm (° C.) | Transmittance (%) 25° C. | 45° C. | 80° C. | Contact Angle (°) |
|---|---|---|---|---|---|
| E1 | 44.7 | 1 | | 72 | 64.3 |
| E2 | 44.1 | 1 | | 73 | 59.8 |
| E3 | 43.5 | 2 | | 77 | 49.3 |
| E4 | 70.2 | 1 | 1 | 74 | 67.2 |
| E5 | 64.4 | 2 | 2 | 76 | 65.4 |
| E6 | 63.2 | 2 | 2 | 81 | 63.9 |

For the purpose of discussion, the modified polyesters E1 to E6 are categorized into Group 1 (E1-E3) and Group 2 (E4-E6) according to the aliphatic diacid used.

For a material, the contact angle to water may represent the hydrophilicity thereof. Referring to Table 3, the contact angles of modified polyesters E1 to E3 are 64.3°, 59.8°, and 49.3°, respectively. These data reveal that the addition of diamine (HMDA) may decrease the contact angle to water of the present modified polyester, thereby increasing the hydrophilicity thereof. It is inferred that the increase in hydrophilicity may be resulted from the hydrogen bonds formed by amide bonds generated during the polycondensation between the diamine and the esters. Similarly, the contact angles of modified polyesters E4 to E6 also decrease as the amount of diamine increases. Besides, the contact angles of Group 2 modified polyesters are higher than that of their counterparts (for example, E1 vs. E4, and E3 vs. E6) in Group 1 modified polyesters. It is believed that the longer carbon chain and higher molecular weight of sebacic acid used in Group 2 modified polyesters may account for the decrease in hydrophilicity in Group 2 modified polyesters.

In group 1, the melting temperature of modified polyesters E1, E2, and E3 are 44.7° C., 44.1° C., and 43.5° C., respectively. By contrast, the melting temperature of modified polyesters E4 to E6 (Group 2) are 70.2° C., 64.4° C., and 63.2° C., respectively. By comparing the data between these two groups, it is evidenced that the melting temperature of the modified polyester could be adjusted by altering the carbon number of the aliphatic diacid used in the manufacturing process. Also, by comparing the melting temperatures of modified polyesters within the same group, it is concluded that the amount of diamine used in the manufacturing process may affect the melting temperature of the resultant modified polyester.

As described hereinabove, modified polyesters according to embodiments of the present invention are thermoplastic materials and exhibit shape-memory characteristic. As such, the present modified polyesters were heated to various temperatures to investigate their respective phase transformation temperature. Test results show that the phase transformation temperature of the material is quite close to the melting temperature of the respective modified polyester, which means the present modified polyesters are $T_m$-based shape memory materials. As discussed hereinabove, modified polyesters according to embodiments of the present invention may have phase transformation temperatures in the range of about 40-99° C. For example, for modified polyesters E1 to E3, the phase transformation temperatures of these materials are in the range of about 43-45° C.; for modified polyesters E4 to E6, the phase transformation temperatures of these materials are in the range of about 63-72° C.

As used herein, the operation temperature of the shape memory material is the temperature range within which the material could be programmed to obtain its temporary shape. As such, the operation temperature usually depends on the phase transformation temperature of the material. Take modified polyester E1 for example it could be heated to a temperature above 44.7° C. (for example, 45° C.) and deformed at such temperature before being cooled to a temperature below 44.7° C. (for example, 44° C.) to fix the temporary shape; hence, suitable operation temperature for modified polyester E1 could be about 40-50° C. Accordingly, suitable operation temperatures of modified polyesters E2 and E3 are also in the range of about 40-50° C., whereas suitable operation temperature of modified polyesters E4-E6 are in the range of about 60-80° C. In view of this, the operation temperatures of the modified polyesters according to some embodiments of the present invention are about 40° C. to 80° C., which is much lower than some conventional shape memory thermoplastic materials. Lower operation temperatures are advantageous at least in that the user may handle the material in a relatively lower, and hence safer, temperature.

As could be appreciated by those with ordinary skills in the art, the upper limit of the operation temperature could be higher than those specified hereinabove as long as it does not exceed the $T_{perm}$ (the highest thermal transition shown in the phase diagram, wherein the phase with $T_{perm}$ is responsible for the fixation of the permanent shape) of the material. Also, the lower limit of the operation temperature could be lower than those specified hereinabove; however, the efficacy and rate of the transformation process, as could be appreciated by those with ordinary skills in the art, would be lower. As such, it is preferable in some embodiments that the suitable lower limit of the operation temperature is no less than 5° C. under the $T_{trans}$ of the material.

Figure 2A:
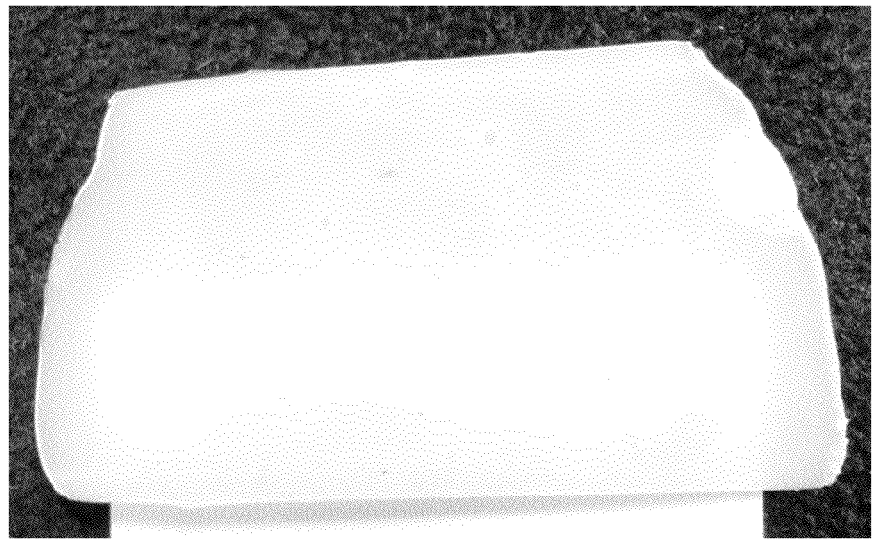
FIG. 2A is a photograph illustrating the appearance of the modified polyester of working example E6 at room temperature.
Figure 2B:
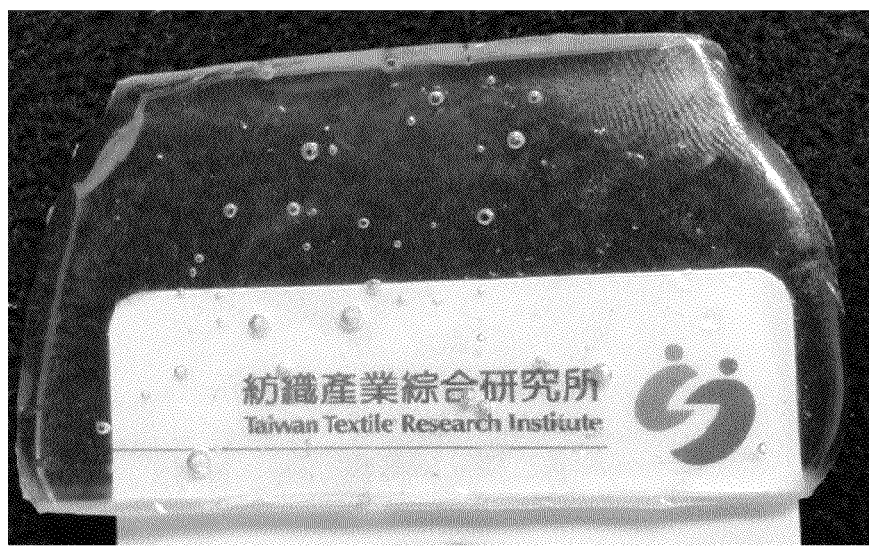
FIG. 2B is a photograph illustrating the appearance of the modified polyester of working example E6 after being immersed in 80° C. water for a minute.

It is also found through the test that the transparency of the material may change in response to temperature changes. FIG. 2A, FIG. 2B and data summarized in Table 3 illustrate that the transparency of the present modified polyester may be substantially increased upon activation. Still referring to Table 3, all of the cantilever beam samples of modified polyesters E1 to E6 are substantially opaque at room temperature (about 25° C.) and each has a visible light transmittance no greater than 2%. As discussed hereinabove, Group 1 (E1-E3) and Group 2 (E4-E6) modified polyesters respectively have an operation temperature of about 40-50° C. and about 60-80° C. As such, samples of modified polyesters E1 to E3 were immersed in warm water of about 45° C. for a minute whereas samples of modified polyesters E4 to E6 were immersed in 80° C. water for a minute to activate these modified polyesters, and the visible light transmittances thereof were then measured. Data summarized in Table 3 illustrate that after being activate, samples E1 to E3 have light transmittances greater than 70%, which means that these samples are almost transparent to naked eyes. By contrast, samples E4 to E6 remain opaque when being immersed in 40-50° C. water, which is evidenced by their respective visible light transmittance as summarized in Table 3. However, after being activated at a temperature higher than their respective phase transformation temperature, the light transmittances of samples E4-E6 also increase to such an extent that the samples are almost transparent to naked eyes (light transmittance greater than 70%).

Attention is now directed to FIG. 2A in which there is seen a photograph illustrating that the modified polyester E6 is opaque at room temperature (about 25° C.). The same modified polyester was then immersed in 80° C. water for a minute to activate the modified polyester, and the photograph in FIG. 2B illustrates that modified polyester E6 is transparent upon activation such that the object thereunderneath is clearly visible.

As could be appreciated by persons with ordinary skills in the art, most conventional thermoplastic materials would become viscous if they are heated beyond their respective melting temperature. By contrast, the present modified polyester, upon being activated, would become flexible rather than viscous. Besides, the operation temperature of the present modified polyesters is lower than that of many other shape memory materials. Moreover, the transparency of the present modified polyesters would increase significantly upon being heated beyond the phase transformation temperature thereof. Since the present modified polyesters exhibit these characteristics it is finding numerous applications in various fields.

Generally, the process of changing the shape of a material from its original shape (the permanent shape) to its temporary shape is called programming, whereas the process of changing the shape from the temporary shape to the permanent shape is called recovery. The programming and recovery process of modified polyester E6 is demonstrated in FIG. 3A to FIG. 3E.

As shown in FIG. 3A, modified polyester E6 was processed by conventional means to receive its permanent shape (the original shape). Then modified polyester E6 was immersed in water of about 80° C. so as to activate modified polyester E6 (FIG. 3B). The activated modified polyester E6 was then deformed by an external stress (FIG. 3C), and the deformed modified polyester E6 was cooled down to a temperature below the phase transformation temperature of the material (in this case, about 63.2° C.) to "fix" the material to a temporary shape as shown in FIG. 3D, thereby completing the programming process. Afterwards, in the recovery process, the modified polyester E6 having the temporary shape was immersed in water of about 80° C. to recover its permanent shape without the exertion of any external force.

As is apparent from FIG. 3A to FIG. 3E, the visible light transmittance of the present modified polyester seems to be related to the activation status of the present modified polyester. As such, the present modified polyesters were heated beyond their respective phase transformation temperature and then gradually cooled down in ambient environment to investigate the visible light transmittance of the material at various times of the cooling process.

For example, modified polyesters E2 and E3 were immersed at water of about 45° C. for 1 minute and then cooled down. The visible light transmittance of the test material was measured every five minutes, and some of the results are summarized in Table 4.

TABLE 4

|  | 0* | 5 min | 10 min | 15 min | 20 min | 30 min | 40 min |
|---|---|---|---|---|---|---|---|
| E2 | 73% | 72% | 44% | 25% | 7% | 3% | 1% |
| E3 | 77% | 75% | 52% | 44% | 11% | 4% | 2% |

*Measured immediately after the test material was taken out of the water.

As shown in Table 4, after the activation process, the modified polyesters E2 and E3 both exhibit a visible light transmittance higher than 70%, which means these materials are quite transparent to naked eyes. Also, the activated materials are quite flexible, and could be flexed and stretched easily. However, as the material gradually cool downs, the visible light transmittance thereof may decrease, and the materials are getting rigid thereby rendering it harder to deform the material. Test results show that during the programming process of such material, the external stress applied on the material could be remove when the light transmittance is lower than 50% without jeopardizing the intended shape created by the external stress. In this instance, the temporary shape has been "fixed". Besides, when the light transmittance is lower than 20%, the physical properties (e.g., rigidity, flexibility, light transmittance, etc.) of the test materials are substantially the same as the original materials that are not activated.

For example, modified polyester E2 was activated after being immersed in water of 45° C. for 1 minute, and then it was taken out of the water and an external stress was applied thereon to deform the activated modified polyester E2. The modified polyester E2 was cool down in ambient environment to fix the shape thereof and the external stress could be removed after 10 minutes after being cooled down. The material would retain its original physical properties after 20 minutes after being cooled down. In another example, the external stressed exerted on modified polyester E3 could be remove after 15 minutes after being cooled down, and the material would retain its original physical properties after 20 minutes after being cooled down. Data shown in Table 4 also demonstrate that minor amount of HMDA would affect the time required to fix the material during the programming process of the present shape memory material.

Melting temperatures of modified polyesters of Group 2 are higher than that of modified polyesters of Group 1; as such, modified polyesters E5 and E6 were immersed at water of about 85° C. for 1 minute and then cooled down. The visible light transmittance of the test material was measured every 20 seconds, and some of the results are summarized in Table 5.

TABLE 5

|    | 0*    | 20 s  | 40 s  | 60 s  | 80 s  | 100 s | 120 s | 140 s | 160 s | 180 s |
|----|-------|-------|-------|-------|-------|-------|-------|-------|-------|-------|
| E5 | 76%   | 76%   | 75%   | 74%   | 75%   | 75%   | 74%   | 51%   | 24%   | 9%    |
|    | 200 s | 220 s | 240 s | 260 s | 280 s | 5 min | 6 min | 7 min | 8 min | 9 min |
|    | 5%    | 4%    | 3%    | 3%    | 2%    | 2%    | 1%    | 1%    | 1%    | 1%    |
|    | 0*    | 20 s  | 40 s  | 60 s  | 80 s  | 100 s | 120 s | 140 s | 160 s | 180 s |
| E6 | 81%   | 82%   | 83%   | 85%   | 85%   | 85%   | 82%   | 69%   | 63%   | 40%   |
|    | 200 s | 220 s | 240 s | 260 s | 280 s | 5 min | 6 min | 7 min | 8 min | 9 min |
|    | 25%   | 17%   | 14%   | 12%   | 10%   | 10%   | 5%    | 4%    | 2%    | 1%    |

*Measured immediately after the test material was taken out of the water.

As shown in Table 5, after the activation process, the modified polyesters E5 and E6 both exhibit a visible light transmittance higher than 70%, and the activated materials are quite flexible such that they could be flexed and stretched easily. Similarly, as the material gradually cool downs, the visible light transmittance thereof may decrease, and the materials are getting rigid thereby rendering it harder to deform the material. Test results show that the external stressed exerted on modified polyester E5 could be remove after 140 seconds after being cooled down, and the material would retain its original physical properties after 180 seconds after being cooled down, whereas the external stressed exerted on modified polyester E6 could be remove after 160 seconds after being cooled down, and the material would retain its original physical properties after 200 seconds after being cooled down. In the present modified polyesters, the effect of different polyester compositions to the fixing time could be observed by comparing data shown in Tables 4 and 5.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention.

What is claimed is:

1. A process for manufacturing a modified polyester, comprising the steps of: carrying out an esterification reaction of diacid, diol and a branching agent having at least three carboxyl groups at a temperature of about 180 to 300° C. and a pressure of about 1 to 4 bar to obtain a product of esterification, wherein the molar ratio of the diacid to the diol is about 1:1 to 1:2, and the branching agent is present in an amount of 0.02 to 1 mol % based upon the total moles of the diacid and the diol; and carrying out a polycondensation reaction of the product of esterification and diamine at a pressure below about 0.01 bars to obtain the modified polyester, wherein the diamine is present in an amount of about 0.07 to about 0.22 mol % based upon the total moles of the diacid and the diol; wherein the diacid comprises a combination of at least one aliphatic diacid and at least one aromatic diacid, and the aromatic diacid is present in an amount no greater than about 10 mol % based upon the total moles of the diacid and the diol and the modified polyester is a thermally induced shape-memory material having an activation temperature of about 40 to 99° C., a percent elongation of about 29.9% to 40.9% at break, a bending modulus of about 40.3 MPa to about 20.1 Mpa.

2. The process of claim 1, wherein the diacid comprises at least one aliphatic diacid selected from the group consisting of succinic acid, glutaric acid, adipic acid, pimelic acid, suberic acid, azelaic acid, sebacic acid, undecanedioic acid, and dodecanedioic acid.

3. The process of claim 1, wherein the diacid comprises at least one aromatic diacid selected from the group consisting of terephthalic acid, isophthalic acid, and 2,6-naphthalene dicarboxylic acid.

4. The process of claim 1, wherein the diol is at least one substance selected from a group consisting of:
   1,2-ethanediol, 1,2-propanediol, 1,3-propanediol, 1,4-butanediol, 1,5-pentane-diol, 1,6-hexanediol, 1,7-heptanediol, and 1,8-octanediol.

5. The process of claim 1, wherein the branching agent is at least one substance selected from a group consisting of:
   trimellitic acid, trimesic acid, trimethylolpropane triacrylate, ethoxylated trimethylolpropane triacrylate, propoxylated trimethylolpropane triacrylate, glyceryl triacrylate, ethoxylated glyceryl triacrylate, propoxylated glyceryl triacrylate, glyceryl trimethacrylate, ethoxylated glyceryl trimethacrylate, propoxylated glyceryl trimethacrylate, trimethylolpropane trimethacrylate, ethoxylated trimethylolpropane trimethacrylate, and propoxylated trimethylolpropane trimethacrylate.

6. The process of claim 1, wherein the diamine is an aliphatic diamine.

7. The process of claim 6, wherein the aliphatic diamine is at least one substance selected from a group consisting of: hexamethylenediamine, heptamethylenediamine, octylenediamine, nonamethylenediamine, and decamethylenediamine.

8. The process of claim 1, wherein the esterification reaction is carried out for about 1 to 6 hours.

9. The process of claim 1, wherein the polycondensation reaction is carried out for about 0.5 to 6 hours.

\* \* \* \* \*